United States Patent [19]

Majumdar et al.

[11] Patent Number: 4,961,787
[45] Date of Patent: Oct. 9, 1990

[54] CEMENT COMPOSITION

[75] Inventors: Amalendu J. Majumdar, St, Albans; Bahadur Singh, Watford, both of England

[73] Assignee: National Reserach Development Corporation, London, England

[21] Appl. No.: 250,093

[22] Filed: Sep. 28, 1988

[30] Foreign Application Priority Data

Oct. 15, 1987 [GB] United Kingdom ............... 8724184
Feb. 23, 1988 [GB] United Kingdom ............... 8804111
Aug. 12, 1988 [GB] United Kingdom ............... 8819212

[51] Int. Cl.$^5$ ............................................. C04B 7/00
[52] U.S. Cl. ................................ 106/692; 106/695; 106/791
[58] Field of Search ............................ 106/104, 117

[56]  References Cited

U.S. PATENT DOCUMENTS 1,803,582  4/1931  Zucco .
4,396,422  8/1983  Matsuno et al. ................. 106/104
4,605,443  7/1986  MacDowell .

FOREIGN PATENT DOCUMENTS

0113593A2  7/1984  European Pat. Off. .
0241230A1  5/1987  European Pat. Off. .
1198723    8/1965  Fed. Rep. of Germany .
797493     2/1936  France .
10312      of 1888 United Kingdom .
957094     5/1964  United Kingdom .
995348     6/1965  United Kingdom .
2153341B   10/1987 United Kingdom .
2188923A   10/1987 United Kingdom .

OTHER PUBLICATIONS

F. M. Lea, "The Chemistry of Cement & Concrete", Edward ARnold, 1970, SNB 7131 2277 3, pp. 497–496.
Vuillemin, "The Use of Mixtures ...", Building Materials, vol. CVIII, No. 18, 2 May 1936 (translation from French).
Locher, "Hydraulic Properties and Hydration ...", 4th Intl. Sump. on the Chemistry of Cement, Washington, D.C., 1960, pp. 267–276.
Rao et al., "Chemistry of Arresting Strength ...", Paper Y51, 7th Intl. Congress on Cement, 1980, pp. 51–57.
Sugi et al., "Fundamental Experiments on Gypsum–Blastfurnace Slag–Alumina Cement Systems", Cement Association of Japan, 1976 Proceedings, pp. 73–76.
Neville, "HAC Concrete", Construction Press (1975), p. 14.

Primary Examiner—Olik Chaudhuri
Assistant Examiner—Andrew Griffis
Attorney, Agent, or Firm—Nixon & Vanderhye

[57]  ABSTRACT

The advantae of high alumina cement (early strength, resistance to sulphate attack) are preserved and its disadvantage (weakens with age) is solved by mixing it 50:50 with ground granulated blast furnace slag. This encourages formation of gehlenite octahydrate in preference to or to the exclusion of the harmful 'conversion' (weakening) reaction.

6 Claims, No Drawings

CEMENT COMPOSITION

This invention relates to cement compositions; more particularly, this invention relates to hydraulic cement-forming compositions comprising high alumina cement, and to hardened masses formed therefrom by addition of water.

Two types of high alumina cements (HAC) are in common use; the first type, and the one used in civil engineering, is light grey to black in colour and is made from bauxite. The invention relates to this type. In the UK the cement is sold under the name Ciment Fondu. The second (pure) type of HAC, white in colour, of which one brand name is Secar 71. is made from alumina and is used as the bonding agent for castable refractories in high temperature applications. It is also used in the manufacture of refractory concrete. The cementive properties of HACs derive, in the main, from calcium aluminates. As is standard cement nomenclature, the following abbreviations will be used herein: $C=CaO$, $A=Al_2O_3$; $S=SiO_2$; $H=H_2O$. In both types of HAC, monocalcium monoaluminate ($CaO.Al_2O_3$ thus CA) is a principal phase. In Ciment Fondu the other constituents are $C_{12}A_7$, $C_2S$. melilite, ferrite, pleochroite and small amounts of FeO. One sample of Secar 71 by contrast analysed as: 54% $CA_2$+45%$CA$+1% $C_{12}A_7$.

The hydration of CA. which leads to cementive action (in hours) initially produces $CAH_{10}$ and/or $C_2AH_8$; hydrated alumina in either gel or microcrystalline form is also produced. The hydration of $CA_2$ proceeds more slowly (weeks) but yields the same hydrate phases. Under usual ambient conditions the decahydrate is the principal initial hydration product. It, and also $C_2AH_8$ if formed, 'convert' to $C_3AH_6$ at a rate which depends on environmental conditions such as humidity and temperature. The rate of 'conversion' is also dependent on the amount of water initially present during hydration. Concrete made from HAC using a high water/cement ratio and exposed to high humidity at temperatures exceeding 25° C. shows rapid 'conversion'.

One effect of the 'conversion' phenomenon in HAC is loss of compressive strength, and such reductions in the strength of HAC (Ciment Fondu) concrete used under unfavourable environmental conditions (notably, swimming pool roofs) led to several structural failures in the UK in the 1960s. Consequently, Ciment Fondu is no longer recommended for structural use. Concrete made from white HAC and used at high temperatures as a refractory material does not suffer from 'conversion' as, in use, the material is largely anhydrous.

HAC has several important technical advantages over the more commonly used Portland cements, the principal ones being rapid development of strength at early ages and the resistance to certain types of chemical attack, notably attack by sulphates. If the reduction in the strength of the cement following 'conversion' can be arrested, the current applications of HAC might be widened.

US-A-4605443 MacDowell teaches a hydraulic cement comprising a glass of defined $SiO_2: Al_2O_3: CaO$ composition which, when contacted with water-hydrates to form crystals composed predominantly of hydrogarnet solid solution and/or hydrogehlenite with essentially no subsequent conversion. However, this involves three general steps: (1) a batch for a glass of a desired composition is melted.. (2) the glass melt is cooled sufficiently rapidly to form a glass body.. and (3) the glass body is comminuted to very finely-divided particles. Such procedures are expensive and unusual.

A much less radical departure, and more acceptable to normal production methods in the industry, would be to use bulk commercially available starting materials and to blend them. Ground high-alumina cement clinker (a 90% or more crystalline product—not a glass) is one such material. This invention seeks to provide a HAC-forming composition exhibiting enhanced compressive strength retention, especially in hot and/or wet environments.

According, therefore, to one aspect of this invention there is provided a hydraulic cement-forming composition which comprises a high-alumina cement blended with a material such that after hydration of the composition, gehlenite hydrate $C_2ASH_8$ is formed. This may be from, or in preference to, $CAH_{10}$ and/Or $C_2AH_8$ and/or hydrogarnet $C_3AH_6$. A minimum proportion, such as 5 wt %, of gehlenlte hydrate may be necessary, or such proportion as has a sensible influence on the cement microstructure (such as porosity). Its formation is preferably deferred until the composition is a mature paste (i.e. has hardened).

A preferred such material, being also a bulk commercially available starting material as mentioned above. is granulated blast furnace slag. Other latently hydraulic or pozzolanic materials may also be suitable, such as microsilica ('silica fume') a byproduct of ferrosilicon metallurgy. (Crystalline silica such as sand does not count as pozzolanic.)

According, therefore, to another aspect of this invention there is provided a hydraulic cement-forming composition which comprises from 30 to 70% by weight of a high-alumina cement blended with from 70 to 30% by weight of granulated blast furnace slag. wherein the high alumina cement has a composition comprising CaO in an amount from 38 to 45% by weight., and $Al_2O_3$ in an amount from 35 to 55% by weight, and the granulated blast furnace slag has a composition comprising CaO from 28 to 50% by weight; $SiO_2$ from 28 to 38% by weight; and $Al_2O_3$ from 10 to 24% by weight.

By "granulated blast furnace slag" (GBFS) is meant herein the glassy by-product obtained in the manufacture of pig-iron which is quenched in water or steam-cooled or pelletised (e.g. as sold by Tarmac). as opposed to air-cooled slag. which is crystalline. and which does not in the main participate chemically in cement but acts rather as inert filler. The GBFS is of the composition suitable for use with Portland cement in blended cement and comprises lime, silica and alumina. It may also contain minor amounts of other components including magnesia, iron and manganese oxides and some sulphide. As may be seen from FM Lea "The Chemistry of Cement and Concrete" Arnold 1970. the percentage by weight of each component will generally lie within the range:

| | |
|---|---|
| CaO | 28% to 50% |
| $SiO_2$ | 28% to 38% |
| $Al_2O_3$ | 10% to 24% |
| MgO | up to 21% |
| $Fe_2O_3$ | up to 4% |
| MnO | up to 3% |
| Sulphur | up to 3% |

The granulated blast furnace slag should suitably have a specific surface (Lea and Nurse) >3,500 cm²g⁻¹, desirably >4,000 cm²g⁻¹ and preferably >4,300 cm²g⁻¹. When ground down to these standards, it is known as "ground granulated blast furnace slag" (GGBFS). It may be replaced, at least in part, by a natural or synthetic pozzolana, for example, silica fume.

This invention may be practised with any high-alumina cement. Suitably as may be seen from FM Lea (ibid), the high-alumina cement has a composition comprising CaO in an amount from 35 to 45% by weight and $Al_2O_3$ in an amount from 38 to 55% by weight. Where enhanced strength is required, or the use envisaged is in a refractory application such as to produce a castable refractory or in the manufacture of refractory concrete, it is preferable to use a white high-alumina cement; that is, one in which the only major phases present are CA and $CA_2$.

In accordance with a preferred aspect of the invention it is desirable that the high-alumina cement is present in an amount from 60 to 40% by weight of the hydraulic cement-forming composition preferably, the amount is from 55 to 45% by weight.

Where appropriate, chemical additives such as superplasticisers, and wetting agents may be used.

This invention also provides a hydraulic cement-forming composition as herein described which also comprises sand and/or aggregate.

This invention further provides a method of forming a cementitious mass, comprising adding water to a composition as herein described, and also provides a hardened cementitious mass formed by addition of water to a composition as herein described, for example placed as a floor screed.

After careful durability studies, the compositions set forth above according to the invention may possibly become contemplated for other civil engineering applications, such as cast products.

The following Examples illustrate the invention.

EXAMPLE 1

In this Example, which relates to cement paste, granulated blast furnace slag GBFS, the analysis of which is shown in Table 1, was used. This GBFS was "Cemsave", a product of the Frodingham Cement Company, and it was ground before use to 4380 cm²/g to form ground GBFS (GGBFS).

TABLE 1

| Analysis by mass of ground granulated blast furnace slag | |
| --- | --- |
| $Al_2O_3$ | 13.5 |
| $SiO_2$ | 33.1 |
| $Fe_2O_3$ | 0.54 |
| CaO | 40.8 |
| MgO | 6.54 |
| $K_2O$ | 0.54 |
| $Na_2O$ | 0.30 |
| $TiO_2$ | 0.41 |
| $P_2O_5$ | 0.03 |
| $Mn_2O_3$ | 0.67 |
| $V_2O_5$ | 0.02 |
| SrO | 0.06 |
| BaO | 0.04 |
| Total sulphur | 1.54 |

Two types of HAC were used: Ciment Fondu and white HAC Secar 71, both manufactured by the Lafarge Aluminous Cement Company. Several mixes were formed into pastes using water/solid (w/s) ratios of 0.3 and 0.4 by weight; 10 mm cubes were made from these pastes. The cubes were then cured in moist air for 24 hours and were then transferred to water tanks kept at 20°, 40° and 50° C. for storage under water. For the white HAC, only the 50:50 mixture of Secar 71 and GGBFS was prepared. The compressive strength results up to 1 year (and some for 2 years) obtained with HAC+GGBFS are listed in Table 2. For comparison, data on neat cement pastes are also given. It will be apparent that cubes prepared from neat cement pastes, especially the wetter ones, deteriorate with age.

TABLE 2

| Matrix | | | 24 Hours (moist air) | 7 Days under water | | | 28 Days under water | | | 180 Days under water | | | 1 Year under water | | | 2 Years under water | |
| --- | --- | --- | --- | --- | --- | --- | --- | --- | --- | --- | --- | --- | --- | --- | --- | --- | --- |
| HAC (wt %) | Slag (wt %) | W/S ratio | | 20° C. | 40° C. | 50° C. | 20° C. | 40° C. | 50° C. | 20° C. | 40° C. | 50° C. | 20° C. | 40° C. | 50° C. | 20° C. | 40° |
| Ciment Fondu | | | | | | | | | | | | | | | | | |
| 100 | — | 0.30 | 87 | 112 | 130 | 81 | 113 | 158 | 89 | 119 | 61 | 108 | 140 | 60 | 128 | — | — |
| 70 | 30 | 0.30 | 87 | 108 | 131 | 147 | 124 | 166 | 117 | 137 | 130 | 83 | 123 | — | — | — | — |
| 50 | 50 | 0.30 | 79 | 94 | 123 | 110 | 122 | 132 | 95 | 140 | 143 | 136 | 135 | 145 | 155 | — | — |
| 40 | 60 | 0.30 | 53 | 68 | 92 | 80 | 91 | 107 | 96 | 118 | 170 | 133 | 111 | 126 | 115 | — | — |
| 30 | 70 | 0.30 | 38 | 48 | 46 | 54 | 61 | 75 | 65 | 91 | 102 | 86 | 99 | 119 | 97 | 85 | 109 |
| 100 | — | 0.40 | 76 | 86 | 93 | 32 | 101 | 63 | 42 | 95 | 45 | 29 | 97 | 41 | 51 | — | 48 |
| 50 | 50 | 0.40 | 37 | 52 | 56 | 42 | 69 | 82 | 37 | 87 | 82 | 43 | 84 | 95 | 42 | — | — |
| 40 | 60 | 0.40 | 28 | 34 | 52 | 23 | 51 | 78 | 32 | 75 | 94 | 55 | 70 | 97 | 70 | — | — |
| 30 | 70 | 0.40 | 15 | 16 | 16 | 14 | 19 | 20 | 14 | 24 | 34 | 14 | 26 | 54 | 22 | 23 | 69 |
| Secar 71 | | | | | | | | | | | | | | | | | |
| 100 | — | 0.30 | 77 | 101 | 160 | 145 | 134 | 135 | 143 | 100 | 130 | 185 | 121 | 135 | 172 | — | — |
| 50 | 50 | 0.30 | 37 | 78 | 87 | 84 | 97 | 101 | 107 | 142 | 141 | 159 | 139 | 157 | 163 | 140 | 134 |
| 100 | — | 0.40 | 50 | 103 | 123 | 87 | 117 | 67 | 90 | 127 | 90 | 86 | 137 | 88 | 96 | 106 | 74 |
| 50 | 50 | 0.40 | 24 | 59 | 63 | 61 | 84 | 85 | 55 | 100 | 97 | 74 | 107 | 114 | 89 | 116 | 123 |

Compressive strength in MPa. Samples were taken out of water and kept in air for 30–60 minutes before testing.

It is to be observed that the one-day compressive strengths of Ciment Fondu +GGBFS mixtures decrease as the proportion of GGBFS increases, at both 0.3 and 0.4 w/s ratios. The seven-day compressive strengths at 20° C. also follow this trend, but for mixtures having 0.3 w/s and kept under water for 28 days, the compressive strengths of some specimens have exceeded that of the neat paste. By 180 days this trend is firmly established and the compressive strengths of 1:1 HAC+GGBFS mixtures are significantly higher than that of the neat paste. When 0.4 w/s is used, at 20° C, the compressive strengths of the HAC +GGBFS mixtures has not surpassed that of the neat cement paste by 180 days., but some specimens have come very close to this value starting from rather low initial compressive strength values.

Whereas the compressive strength of the neat Ciment Fondu paste has remained more or less constant with time at 20° C. from 7 to 180 days, the compressive strengths of the mixtures have progressively increased for both 0.3 and 0.4 w/s ratios. This suggests that the components of the mixtures are reactive towards each other, and that their compressive strength gains result from such interactions.

EXAMPLE 2

In this Example, a 1:3:0 by weight mortar (i.e. 1 cement: 3 sand: 0 aggregate) of a hydraulic cement forming composition according to the invention (weight ratio GGBFS:HAC 1:1) was cast, with vibration, into cubes, and the compressive strengths of the cubes were then determined in accordance with BS 915: Part 2: 1972. The results, together with comparative results in which the cement comprises no added GGBFS, are shown in Table 3.

mens made by using a water/solid ratio of 0.4. At 40° C. the compressive strengths of neat cement samples after 180 days are less than half of that after 7 days. When 50 or 60% of this cement has been replaced by GGBFS, the compressive strengths of the mixtures after 180 days at 40° C. are not only significantly higher than their respective values after 7 days, but have become comparable with the strength of neat cement paste samples at ambient temperatures. The same is largely true also for mixtures prepared with a w/s ratio of 0.3. It is also interesting to note from Table 2 that the proportionate increases in compressive strengths from 7 days to 180 days at both 20° C and 40° C. rise with the proportion of GGBFS used. This again suggests an interaction between the HAC and GGBFS, its degree depending on the temperature and the water content of the mixture. The GGBFS will hydrate at 40° C. but, in the presence of the products of hydration of HAC, GGBFS hydration leads to a strong product which resists the disruptive forces brought about by the 'conversion' in HAC.

The results obtained with mixtures of white HAC Secar 71 and GGBFS given in Table 2 support the view expressed above.

TABLE 3

| | | | | | Compressive strength MPa 1:3 cement mortar (70.7 mm cubes) W/S = 0.40 | | | | |
|---|---|---|---|---|---|---|---|---|---|
| | Mix | W/S | Setting time | | 24 hours | 7 days | 28 days | 180 days | 1 year |
| Cement Composition | ratio | ratio | Initial | Final | moist air | water | water | water | water |
| Ciment Fondu | — | — | — | — | 73 | 82 | 88 | 90 | 85 |
| Ciment Fondu + GGBFS | 1:1 | 0.28 | 2 h - 56 min | 3 h - 30 min | 38 | 47 | 70 | 85 | 89 |
| Secar 71 | — | — | — | — | 43 | 72 | 84 | 96 | 93 |
| Secar 71 + GGBFS | 1:1 | 0.27 | 3 h - 50 min | 4 h - 25 min | 26 | 58 | 72 | 88 | 89 |
| HAC (BS 915:1972 | — | — | <2 h and >6 h | >h after the initial set | 42 | 49 (3 days) | | | |

EXAMPLE 3

Concrete cubes were cast comprising compositions according to the present invention using (by weight) 1:2.4:3.6 of cement:sand:aggregate. The aggregate was Thames Valley Flint.

The results are presented in Table 4. They clearly show that at 38° C concrete made from HAC alone loses a substantial proportion of its initial strength after only 28 days. However, at this temperature no reduction in strength has been observed in compositions according to the present invention.

From Table 3 it may be observed that after 180 days in water the compressive strengths of mortars made from HAC+GGBFS reach a similar level to that of mortars made from neat HAC. The initial compressve strengths of the mortars made from the HAC +GGBFS mixtures are somewhat lower than that of mortars made from neat cements. The BS requirement for the 1-day strength is nearly met by the 50:50 mixture of Ciment Fondu+GGBFS. The early strength of these mixtures is, therefore, considerable in comparison to say, Portland cements.

TABLE 4

| | Compressive strength in MPa of 100 mm concrete cubes stored under water | | | | | | | | | | | |
|---|---|---|---|---|---|---|---|---|---|---|---|---|
| | | Workability of concrete | | | | Compressive strength after:- | | | | | | |
| Cement type | W/S | Slump$^{XX}$ (mm) | VB (sec) | CF$^{xx}$ | Water at | 24 hours (moist air) | 3 days | 7 days | 28 days | 90 days | 180 days | 1 year |
| HAC (Ciment Fondu) | 0.56 | 32 | 4 | 0.89 | 20° C. | 54.5 | 58.0 | 64.5 | 72.9 | 71.7 | 73.8 | 66.4 |
| | | | | | *38° C. | — | 65.4 | 59.2 | 25.5 | 24.5 | 24.2 | 22.7 |
| HAC + ggbfs (50/50) | 0.56 | 65 | 4 | 0.91 | 20° C. | 24.9 | 27.9 | 27.6 | 34.6 | 42.7 | 45.1 | 53.1 |
| | | | | | *38° C. | — | 25.4 | 29.2 | 43.0 | 52.5 | 52.9 | 62.7 |
| HAC (Ciment Fondu) | 0.45 | 4 | 11 | 0.77 | 20° C. | 64.3 | 72.2 | 78.1 | 82.3 | 84.8 | 90.2 | 90.7 |
| | | | | | *38° C. | — | 79.2 | 80.2 | 56.0 | 37.9 | 37.6 | 36.6 |
| HAC + ggbfs (50/50) | 0.45 | 5 | 11 | 0.77 | 20° C. | 37.6 | 40.5 | 46.2 | 52.6 | 60.8 | 61.6 | 63.8 |
| | | | | | *38° C. | — | 46.3 | 47.1 | 55.8 | 64.8 | 66.0 | 69.9 |

*Samples were cooled in air for 30 minutes and then put in water at 20° C. for another 30 minutes before testing.
$^{xx}$Part of BS 1881:1952 applicable to fresh concrete.
W/S = water/solids by weight.

The effect of 'conversion' at high temperature on the compressive strength of Ciment Fondu is best illustrated (see Table 2) by the results obtained with speci- The setting times of the two types of HAC+GGBFS determined as in BS 915:1972 are given in Table 3. and can be seen to conform to BS specifications.

It is clear from these results that a satisfactory cementive mixture can be produced by mixing ground granulated blast furnace slag with high-alumina cements. Taking Ciment Fondu which represents the type of cement used in civil engineering a 50:50 mixture of cement+GGBFS will have most of the beneficial attributes of HAC such as high early strength and chemical resistance. Curing under water at temperatures up to 50° C. for long periods of time has shown that the compressive strengths of the mixtures increase in most cases.

Evidence from results obtained with the mixtures of white HAC (CA) or Ciment Fondu with GGBFS reacted at the different temperatures under wet conditions suggests that their strength gain, particularly at the higher temperatures, may be due to the presence of gehlenite hydrate $C_2ASH_8$.

Indeed, in concrete made from a mixture of Ciment Fondu and GGBFS, gehlenite hydrate ($C_2ASH_8$). and not the hexagonal or cubic calcium aluminate hydrates, may form the major hydrated phase. In the third paste down in Table 2, made from the 1:1 Ciment Fondu/ggbfs mixture (by mass) using a water/solid ratio of 0.3 and kept in water at 20° C. for 6 months, measurements by quantitative X-ray diffraction indicate the presence of 21% $C_2ASH_8$ and less than 5% of $C_3AH_6$. After one year the proportions of these hydrate phases did not alter significantly.

It appears that in the presence of GGBFS. the calcium aluminate hydrate phases $CAH_{10}$ and $C_2AH_8$. whether in crystalline or amorphous form. disappear with time in the paste forming crystalline and amorphous $C_2ASH_8$. A small amount of $C_3AH_6$ is usually present in the well cureu pastes made from HAC/slag mixtures but its formation was innocuous.

EXAMPLE 4

The compositions of the present invention are also suitable for the production of fast drying screeds.

Screed slabs were made using a composition according to the invention (in particular 50:50 HAC +GGBFS) and. for comparison. ordinary Portland Cement (OPC). Both were made up in two different water/solids weight ratios. The results are shown in Table 5.

TABLE 5

Properties of screed slabs and mortars.

| Properties | w/s ratio | 5 days | OPC 50/50 HAC + slag | | | |
| --- | --- | --- | --- | --- | --- | --- |
| | | | 7 days | 2 days | 4 days | 7 days |
| Loss in weight (%) | 0.452 | 0.45 | 0.66 | 0.32 | 0.51 | 0.61 |
| Relative humidity (%) | | 86 | 74 | 84 | 76 | 73 |
| Shrinkage (%) | | — | 0.020 | — | 0.030 | 0.032 |
| Loss in weight (%) | 0.50 | 1.38 | 1.70 | 1.03 | 1.48 | 1.66 |
| Relative humidity (%) | | 79 | 70 | 86 | 78 | 76 |
| Shrinkage (%) | | — | 0.027 | — | 0.029 | 0.030 |

In assessing the suitability of a material for screed, the parameters given in the Table 5 are important. humidity above the sample measured in a special way indicates how effeciently the screed will dry. The values (not in the Table for OPC) up to 2 days are most important, the lower the better, in this respect the slag/HAC mixture has been found to be superior to OPC.

Shrinkage values are important from the point of view of the dimensional stability of the screed and its proneness or otherwise to cracking. The lower the value, the better it is, and here the OPC screed seems to have marginal advantage.

The one-day compressive strength of 38.0 MPa for the 50/50 HAC/slag mixture is impressive in the sense that the screed is very strong soon after laying. The corresponding value for OPC screed was not measured as it would have been very much lower. Thus, a HAC+GGBFS screed hardens and develops strength much faster than the corresponding OPC screed, which is of great value in civil engineering. The drying properties of screed are also important in the first few days.

We claim:

1. A hydraulic cement-forming composition which comprises from 30 to 70% by weight of a high-alumina cement blended with from 70 to 30% by weight of granulated glassy blast furnace slag, wherein the high alumina cement is made from bauxite and has a composition comprising CaO in an amount from 35 to 45% by weight; and $Al_2O_3$ in an amount from 38 to 55% by weight, and the granulated glass blast furnace slag has a composition comprising CaO from 28 to 50% by weight; $SiO_2$ from 28 to 38% by weight; and $Al_2O_3$ from 10 to 24% by weight, the composition being such that, upon hydration of the composition, gehlenite octahydrate is formed, and its proportion in mature pastes exceeds 5 wt %.

2. A hydraulic cement-forming composition according to claim 1, wherein the granulated blast furnace slag has a specific surface area exceeding 3,500 $cm^2g^{-1}$.

3. A hydraulic cement-forming composition according to claim 1, wherein the high-alumina cement is present in an amount from 60 to 40% by weight.

4. A hydraulic cement-forming composition according to claim 1 which also comprises sand and/or aggregate.

5. A hardened cementitious mass formed by addition of water to a composition according to claim 1.

6. A hardened cementitious mass accordi0ng to claim 5 which is a floor screed.

* * * * *